United States Patent [19]
Hubele

[11] 3,896,224

[45] July 22, 1975

[54] 1-(4',6'-DICHLORO-S-TRIAZIN-2-YLCARBAMOYL)-2-METHOXY-CARBONYLAMINO-BENZIMIDAZOLE AS PESTICIDE

[75] Inventor: Adolf Hubele, Magden, Switzerland

[73] Assignee: Ciba-Geigy Corporation, Ardsley, N.Y.

[22] Filed: July 17, 1974

[21] Appl. No.: 489,314

Related U.S. Application Data

[62] Division of Ser. No. 347,739, April 4, 1973, Pat. No. 3,840,538.

[30] Foreign Application Priority Data

Apr. 10, 1972 Switzerland.......................... 5209/72

[52] U.S. Cl. ............................................... 424/249

[51] Int. Cl.² ...................... A01N 9/00; A01N 9/22
[58] Field of Search.................. 260/249.5; 424/249

[56] References Cited
UNITED STATES PATENTS 3,794,641  2/1974  Gorog et al..................... 260/249.5

*Primary Examiner*—Stanley J. Friedman
*Assistant Examiner*—D. W. Robinson
*Attorney, Agent, or Firm*—Frederick H. Rabin

[57] ABSTRACT

1-(4',6'-Dichloro-s-triazin-2-ylcarbamoyl)-2-methoxycarbonylaminobenzimidazole is disclosed in pesticidal compositions and used as a pesticide.

2 Claims, No Drawings

1-(4',6'-DICHLORO-S-TRIAZIN-2-YLCAR-BAMOYL)-2-METHOXY-CARBONYLAMINO-BENZIMIDAZOLE

This is a division of application Ser. No. 347,739, filed on April 4, 1973 now U.S. Pat. No. 3,840,538.

The present invention relates to 1-(4',6'-dichloro-s-triazin-2'-ylcarbamoyl)-2-methoxycarbonylaminobenzimidazole as pesticide, to a process for its production, and to its use for pest control.

The active substance has the following formula

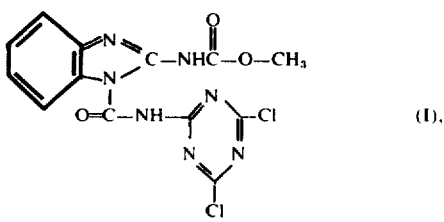

and can be advantageously produced by the process in which a benzimidazolecarbamic acid ester of the formula

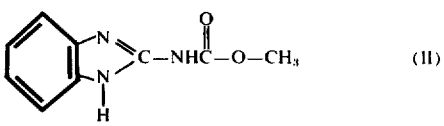

is reacted with an isocyanate of the formula

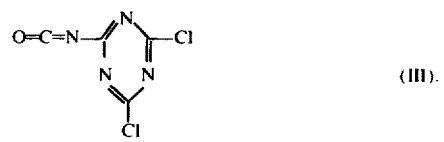

The reaction is preferably peformed in the presence of solvents. Suitable for this purpose are inert solvents such as liquid hydrocarbons (alkanes, benzene, xylene or toluene), ethyl acetate, dioxane, tetrahyrofuran, chlorobenzenes, nitrobenzene, cymol, and so forth.

The compounds of formulae II and III are known and can be produced by methods known per se; for example, by the methods described in the Belgian Patent Specification No. 742,452, or in J. org. Chem. 27, 3742 (1962).

The compound of formula I has a broad biocidal action and can be used for the control of various plant and animal pests.

It is suitable for the control of bacteria and fungi. The said compound possesses, in particular, fungicidal properties rendering it effective against phytopathogenic fungi on a wide variety of cultivated plants and crops, such as cereals, maize, rice, vegetables, ornamental plants, fruit trees, grape vines and field crops.

It is possible with this active substance to check or destroy fungi occurring on plants or on parts of plants (fruits, blossoms, foliage, stalks, tubers or roots), whereby parts of plants subsequently sprouting remain immune from such fungi. The active substance is particularly effective against phytopathogenic fungi belonging to the following classes: Ascomycetes, Basidiomycetes, Phycomycetes or Fungi imperfecti such as Piricularia spp., Fusarium oxysporum or Fusarium nivale.

The new active substances can moreover be employed for the treatment of seeds, fruits, tubers, etc., to provide protection against fungus infections; for example, against smuts, such as ustilaginales.

The componds of formula I can be formulated with other fungicides, bactericides, fungistatics or bacteriostatics in various mixture ratios, with synergistically intensified effects being in some cases obtained.

Furthermore, the compound of formula I possesses nematicidal properties, and can be used for the control of phytoparasitic and of endoparasitic nematodes. The endoparasitic species include, for example, the ascaridae, trichistrongylidae, ancylostomatidae and strongylidae.

The advantage of this compond lies in its favourable toxicity towards warm-blooded animals and in its degree of effectiveness with low dosage amounts. Domestic and productive animals such as cattle, sheep, goats, pigs, horses, poultry, cats and dogs can be treated with the active substance of formula I where nematode infestation in the gastrointestinal tract occurs.

The active substance can be administered in the form of an agent to the animals, the required amount being administered either as a single dose or as repeated doses, whereby the single doses, depending on the species of animal, are preferably between 5 and 1000 mg of active substance per kilogram of body weight. A better action is obtained in some cases by a protracted administration or smaller overall doses may suffice. The active-substance mixtures moreover can be added to the feed or to the drinking water of the animals. The prepared final feed contains the active substance of formula I preferably in a concentration of ca. 0.05 to 1.0 per cent by weight.

The compound of formula I can be used on its own or together with suitable carriers and/or additives. Suitable carriers and additives may be solid or liquid, and correspond to the substances common in formulation practice, such as, e.g. natural and regenerated substances, solvents, dispersing agents, wetting agents, adhesives, thickeners, binders and/or fertilisers.

The agents according to the invention are produced in a manner known per se by the intimate mixing and-/or grinding of the active substance of formula I with suitable carriers, optionally with the addition of dispersing agents or solvents which are inert to the active substances. The active substances can be obtained and used in the following forms:

solid preparations:
    dusts, scattering agents, granulates, coated granulates, impregnated granulates and homogeneous granulates;
liquid preparations:
    a. water-dispersible active-substance concentrates: wettable powders, pastes and emulsions;
    b. solutions.

The solid preparations (dusts, scattering agents) are produced by the mixing of the active substances with solid carriers. Suitable carriers are, e.g. kaolin, talcum, bole, loess, chalk, limestone, ground limestone, attapulgite, dolomite, diatomaceous earth, precipitated silicic acid, alkaline-earth silicates, sodium and potassium aluminium silicates (feldspar and mica), calcium and magnesium oxide, ground synthetic materials, fertilisers such as ammonium sulphate, ammonium phosphate, ammonium nitrate, urea, ground vegetable products such as bran, bark dust, sawdust, ground nutshells, cellulose powder, residues of plant extracts, active charcoal, etc., singly or in admixture with each other.

Granulates can be very easily preparaed by a process in which an active substance of formula I is dissolved in an organic solvent, the thus obtained solution applied to a granulated mineral, e.g. attapulgite, $SiO_2$, granicalcium, bentonite, etc., and the organic solvent then evaporated off.

It is also possible to produce polymer granulates by impregnation of the finished porous polymer granulates (urea/formaldehyde, polyacrylonitrile, polyesters and others), having a specific surface area and favourable predeterminable adsorption/desorption ratio, with the active substance, e.g. in the form of a solution in a low boiling solvent; and subsequent removal of the solvent. Polymer granulates of this kind can be also sprayed in the form of microgranulates, having bulk weights of preferably 300 g/litre to 600 g/litre, with the aid of spraying equipment. Spraying can be carried out over extensive areas of useful plant crops by the use of aeroplanes.

Granulates can also be obtained by the compacting of the carrier material with the active substances and additives, and a subsequent particle-size-reducing operation.

Furthermore, it is possible to add to these mixtures additives stabilising the active substance and/or nonionic, anion-active and cation-active substances which improve, e.g. the adhesiveness of the active substances on plants and parts of plants (adhesives and agglutinants), and/or ensure a better wettability (wetting agents), as well as dispersibility (dispersing agents).

The following substances are, for example, suitable: olein/lime mixture, cellulose derivatives (methyl cellulose, carboxymethyl cellulose), hydroxyethylene glycol ethers of monoalkyl and dialkyl phenols having 5 1 to 15 ethylene oxide radicals per molecule and 8 to 9 carbon atoms in the alkyl radical, lignin-sulphonic acid, the alkali metal and alkaline-earth matal salts thereof, polyethylene glycol ethers (carbowaxes), fatty alcohol polyglycol ethers having 5 to 20 ethylene oxide radicals per molecule and 8 to 18 carbon atoms in the fatty alcohol moiety, condensation products of ethylene oxide, propylene oxide, polyvinyl-pyrrolidones, polyvinyl alcohols, condensation products of urea and formaldehyde, as well as latex products.

Water-dispersible concentrates of active substances, i.e. wettable powders, pastes and enulsion concentrates, are agents which can be diluted with water to obtain any desired concentration. They consist of active substance, carrier, optionally additives which stabilise the active substance, surface-active substances, and anti-foam agents and, optionally, solvents.

The wettable powders and pastes are obtained by the mixing and grinding of the active substances with dispersing agents and pulverulent carriers, in suitable devices, until homogeneity is obtained. Suitable carriers are, e.g. those previously mentioned in the case of solid preparations. It is advantageous in some cases to use mixtures of different carriers. As dispersing agents it is possible to use, e.g.: condensation products of sulphonated naphthalene and sulphonated naphthalene derivatives with formaldehyde, condensation products of naphthalene or of naphthalene-sulphonic acids with phenol and formaldehyde, as well as alkali, ammonium and alkaline-earth metal salts of ligninsulphonic acid, also alkylarylsulphonates, alkali metal salts and alkaline-earth metal salts of dibutyl naphthalenesulphonic acid, fatty alcohol sulphates such as salts of sulphated hexadecanols, heptadecanols, octadecanols, and salts of sulphated fatty alcohol glycol ethers, the sodium salt of oleyl methyl tauride, ditertiary ethylene glycols, dialkyl dilauryl ammonium chloride, and fatty acid alkalimetal and alkaline-earth metal salts.

Suitable anti-foam agents are, e.g. silicone oils.

The active substance is so mixed, ground, sieved and strained with the above mentioned additives that the solid constituent in the case of wettable powders has a particle size not exceeding 0.02 to 0.04 mm, and in the case of pastes not exceeding 0.03 mm. For the preparation of emulsion concentrates and pastes, dispersing agents, such as those mentioned in the preceding paragraphs, organic solvents and water are used. Suitable solvents are, e.g. alcohols, benzene, xylene, toluene, dimethylsulphoxide, and mineral oil fractions boiling in the range of 120° to 350°C. The solvents must be practically odourless, non-phytotoxic, and inert to the active substances.

Furthermore, the agents according to the invention can be used in the form of solutions; these are obtained by the dissolving of the active substance in suitable organic solvents or solvent mixtures. The organic solvents employed can be aliphatic and aromatic hydrocarbons, their chlorinated derivatives, alkylnaphthalenes or mineral oils on their own or in admixture with each other.

The content of active substance in the above described agents is between 0.1 and 95%.

If the active substance of formula I is to used for the control of endoparasites, then the appropriate agent can be administered in the form of solutions, emulsions, suspension (drenches), powders, tablets, boluses and capsules to the animals orally or abomasally. These preparations are made up with the aid of the usual solid carriers, such as kaolin, talcum, bentonite, sodium chloride, calcium phosphate or cottonseed meal, or liquids such as oils that do not react with the active substances, or other solvents or diluents harmless to the animal organism. If water is to be employed as diluent for preparations such as, e.g. drenches or emulsions, or where the agents are to be administered in the form of feed concentrates, then it is necessary to ensure, by the use of a suitable protective formulation (e.g. coated granules), by embedding in hydrophobic materials (e.g. paraffin, silicone oils or waxes), or by absorbtion onto inert solid carriers such as kaolin, talcum, bentonite, kieselguhr or bolus alba, that no premature decomposition occurs. If the anthelmintic agents are in the form of feed concentrates, then the carriers used are, for example, production feed, fodder grain or protein concentrates. Such feed concentrates or agents may also contain, besides the active substances, additives such as vitamines, antibiotics, chemotherapeutics or other pesticides, particularly bacteriostatics, fungistatics, anthelmintics, coccidiostatics or other hormone preparations.

The active substance of formula I can be formulated, for example, as follows:

Dusts:

The following substances are used for the preparation of (a) a 5% dust, and (b) a 2% dust:

a. 5 parts of active substance, 95 parts of talcum;

b. 2 parts of active substance, 1 part of highly dispersed silicic acid, 97 parts of talcum.

The active substances are mixed and ground with the carriers.

Granulate:

The following substances are used to produce a 5% granulate:

5 parts of active substance,
0.25 parts of epichlorhydrin,
0.25 parts of cetyl polyglycol ether, 3.50 parts of polyethylene glycol, 91 parts of kaolin (particle size 0.3 – 0.8 mm).

The active substance is mixed with epichlorhydrin and dissolved with 6 parts of acetone; the polyethylene glycol and cetyl polyglycol ether are then added. The thus obtained solution is sprayed on to kaolin, and the acetone subsequently evaporated in vacuo.

Wettable powder:

The following constituents are used for the preparation of (a) a 40%, (b) and (c) a 25%, and (d) a 10% wettable powder:

a. 40 parts of active substance,
5 parts of sodium lignin sulphonate,
1 part of sodium dibutyl-naphthalene sulphonate,
54 parts of silicic acid.

b. 25 parts of active substance,
4.5 parts of calcium lignin sulphonate
1.9 parts of Champagne chalk/hydroxyethyl cellulose mixture (1:1),
1.5 parts of sodium dibutyl naphthalene sulphonate,
19.5 parts of silicic acid,
19.5 parts of Champagne chalk,
28.1 parts of kaolin.

c. 25 parts of active substance,
2.5 parts of isooctylphenoxy-polyoxyethylene-ethanol,
1.7 parts of Champagne chalk/hydroxyethyl cellulose mixture (1:1),
8.3 parts of sodium aluminium silicate,
16.5 parts of kieselguhr,
46 parts of kaolin.

d. 10 parts of active substance,
3 parts of a mixture of the sodium salts of saturated fatty alcohol sulphates,
5 parts of naphthalensulphonic acid/formaldehyde condensate,
82 parts of kaolin The active substances are intimately mixed, in suitable mixers, with the additives, the mixture being then ground in the appropriate mills and rollers. Wettable powders are obtained which can be diluted with water to give suspensions of any desired concentration.

Emulsifiable concentrates:

The following substances are used to produce (a) a 10% and (b) a 25% emulsifiable concentrate:

a. 10 parts of active substance,
3.4 parts of epoxidised vegetable oil,
3.4 parts of a combination emulsifier consisting of fatty alcohol polyglycol ether and alkylarylsulphonate calcium salt,
40 parts of dimethylformamide,
43.2 parts of xylene.

b. 25 parts of active substance,
2.5 parts of epoxidised vegetable oil,
10 parts of an alkylarylsulphonate/fatty alcoholpolyglycol ether mixture
5 parts of dimethylformamide,
57.5 parts of xylene.

From these concentrates it is possible to produce, by dilution with water, emulsions of any desired concentration.

Spray:

The following constituents are used to prepare a 5% spray:

5 parts of active substance,
1 part of epichlorhydrin,
94 parts of ligroin (boiling limits 160°-190°C).

Water-dispersible powder mixture as supplementary feed 25 parts of active substance,
3 parts of a mixture of polyoxyethylene/tall oil ester urea,
7 parts of polyvinylpyrrolidone,
31.5 parts of highly dispersed silicic acid,
33.5 parts of bolus alba.

The active substance is homogeneously mixed with the polyoxyethylene/tall oil ester urea mixture and polyvinylpyrrolidone, with the addition of ca. 30% of the silicic acid constituent, in a planetary mixer. The remaining part of the silicic acid and the bolus alba are then added, and the whole mixed in suitable mixers to obtain homogeneity. The mixture is subsequently ground in a dowelled disc mill to reduce the particle size of the mixture to below 20 microns.

EXAMPLE 1

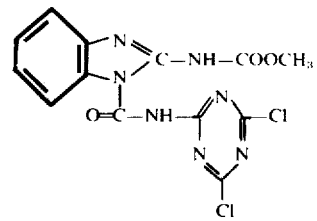

An amount of 23.2 g of 2,4-dichloro-6-isocyanato-s-triazine in 50 ml of ethyl acetate is added dropwise at 20°C in the course of half an hour, with thorough stirring, to a suspension of 23.2 g of 2-benzimidazolemethylcarbamate in 450 ml of ethyl acetate, whereby the internal temperature increases by 4°C. After 15 hours' stirring, filtration is carried out and the obtained product subsequently washed with petroleum ether (B.P. 50°-70°C); melting point: 350°C.

EXAMPLE 2

Fungicidal action

Action against Septoria apicola Spegazzini on celery plants

Celery of the "Challon" variety was grown in a greenhouse. Small plants, each 15 centimeters tall, were sprayed dripping wet with a 0.05% liquor of the active substance, which had been prepared by the dissolving of a 25% wettable powder. After the drying of the applied coating, the plants were infested with a spore suspension of the fungus. There appeared signs of disease after 2 days' standing in a moist chamber and a further 12 days at 20°- 22°C with 90% relative humidity in a greenhouse.

The number and extent of the points of infection served as an evaluation criterion for the effectiveness of the test substance. The results of this test and those of the following tests are given in the subsequent table.

Action against *Puccinia triticina Erikss.* on wheat

Wheat plants, 10 centimeters in length, were sprayed in a greenhouse until dripping wet with a 0.05% liquor of the active substance, which had been prepared by the addition of a 25% wettable powder to water. After the drying of the applied coating, the plants were uniformly infested with a uredospore suspension of the fungus. The occurring signs of disease were evaluated after 5 days' standing in a moist chamber and a further 12 days in a greenhouse at 20°- 22°C with normal humidity. The number and extent of the points of infection served as the evaluation criterion for the effectiveness of the test substance.

Action against *Piricularia oryzae Bri. et Cav.* on rice

Rice plants were grown in a greenhouse and sprayed once prophylactically with a 0.05% aqueous liquor of the active substance. Two days later, the thus treated plants were infested with exospores of Piricularia oryzae Bri. and Cav., and, after 5 days of incubation in a moist chamber, examined for fungus infestation.

Action against *Botrytis cinerea* on *Vicia faba*

In a spraying chamber, *Vicia faba* plants — ca. 10 cm in height — were sprayed dripping wet with a spraying-liquor prepared from the active substance made up in the form of a 25% wettable powder. After the drying of the applied coating, the plants were infested with a conidiospore suspension of the fungus. Evaluation of the test followed after an incubation period of 3 - 4 days at 95 - 100% relative humidity and ca. 21°C.

Action against *Venturia inaequalis* on apple-tree cuttings

Cuttings, 20-30 cm in height and with 6-8 leaves, were sprayed in a greenhouse until dripping wet with a 0.05% active-substance liquor. After the drying of the applied coating, the cuttings were infested with a conidiospore suspension of Venturia inaequalis. An evaluation of the test was made after 5 days at 20° - 24°C with 95-100% relative humidity and a further 14 days at 20° - 24°C with normal humidity.

Action against *Uromyces appendiculatus* on *Phaseolus vulgaris*

Bean plants in the two-leaf stage were sprayed dripping wet with a 0.05% active-substance suspension. After the drying of the applied coating, the plants were infested with a fresh spore suspension of bean rust; and subsequently allowed to stand for one day in a moist chamber, and then for 12 days in a greenhouse at 20°C under normal conditions. The number and extent of the occurring rust pustules served as a criterion for the evaluation of the effectiveness of the test substances.

Action against *Erysiphe graminis* DC. on Hordeum a. Residual action

Young barley plants, ca. 10 cm in length, were sprayed in a greenhouse at 20°C with an 0.05% active-substance liquor prepared from a 25% wettable powder. After the drying of the applied coating, the plants were infested with conidiospores of the fungus. The percentage infestation of the plants was determined after 12 days in a greenhouse at 20°C.

b. Systemic action

Shortly after the emergence (monocotyledon stage) of barley plants in a greenhouse, a 0.05% suspension of the active substance was applied to them in such a manner that, while the plants themselves were not wetted, the resulting active-substance concentrations in the soil were designed to be 100 ppm, 50 ppm and 25 ppm. After a standing time of 24-48 hours, the plants were infested by being dusted with fungus mycelium of Erysiphe graminis DC (from infested barley stalks). An evaluation of the test was made after 10 days at 20°-24°C and normal humidity.

Action against *Erysiphe cichoracearum* on zucchetti plants a. Residual action

Yound zuccetti plants, after being sprayed with a 0.05% suspension of the active substance made up as a wettable powder, and after the drying of the applied coating, were sprayed with a spore suspension of the fungus. The plants were allowed to stand for 8 days in a greenhouse at ca. 23°C; an assessment was then made of the degree of infestation (proportion of the leaf surface coated with mycelium) on the treated and infested leaves compared with that on the untreated but infested control leaves.

b. Systemic action

Shortly after emergence (dicotyledon stage) in a greenhouse, zucchetti plants were treated with a 0.05% suspension of the active substance in such a manner that, while the plants themselves were not wetted, the active-substance concentration in the soil was selectively 100 ppm, 50 ppm and 25 ppm. After a period of 24-48 hours, the plants were infested by being dusted with the fungus mycelium of *Erysiphe cichoracearum* (from infested zuccetti leaves). An evaluation of the test was made after 10 days at 20°-24°C and normal humidity.

In the tests described in Example 2, no fungus infestation was detected with use of the following active-substance concentrations:

| Fungus | Residual action | Systemic action |
|---|---|---|
|  | ppm of AS in spray-liquor with application to leaves | ppm of AS relative to volume of soil with application to soil |
| Septoria apicola | 250 |  |
| Puccinia triticina | 250 |  |
| Piricularia oryzae | 500 |  |
| Botrytis cinerea | 500 |  |
| Venturia inaequalis | 250 |  |
| Uromyces phaseoli | 500 |  |
| Erysiphe graminis | 250 | 25 |
| Erysiphe cichoracearum | 250 | 25 |

EXAMPLE 3

Action against soil fungi

An amount of 30 g of dry sieved soil was placed into Petri dishes, 5 cm in diameter and 1.5 cm in height, and moistened with an active-substance solution so that the soil contained 500 ppm and 250 ppm, respectively, of active substance. About 5 oat grains covered with fungus mycelium were placed into the thus prepared soil at the centre of the Petri dish. The Petri dish was loosely covered with a second dish and allowed to stand for 10 days at 20°-24°C under normal conditions. The evaluation made was with regard to the growth of fungus mycelium occurring during the standing period or the effected inhibition of growth.

With application of the active substance according to the invention, the fungus growth of *Rhizoctonia solani* was completely arrested in the case of 500 ppm and in the case of 250 ppm.

EXAMPLE 4

Action as dressing agent

Oat seeds sterilised at 120°C in an autoclave are used in a 300 ml Erlenmeyer flask as nutrient medium for *Fusarium nivale*. A few days later, the formed mycelium is shaken out with water and employed as an infection solution for the wheat grains used in the actual active substance test. An amount of 100 g of the thus wetted and then dried wheat is shaken in a 1-litre flask with 0.2 g of dry wettable powder (25% active substance content) until this is distributed over the entire surface of the wheat grains. Two lots of 25 prepared grains are then placed on a solidified agar layer 8 mm thick and slightly coloured with cotton blue, in a Petri dish. An evaluation is made after 3 days on the basis of the areola formation of the fungus mycelium.

With the compound according to the invention there occurred on application of an amount of active substance of 500 ppm (relative to 100 g of seed) complete inhibition of fungus growth.

EXAMPLE 5

Action against nematodes

The active substance was administered in the form of a suspension, by stomach probe, to white mice infested with mouse oxyuris. Five animals were used for each test. The active substances were administered to each group of animals once daily on three successive days. The daily dose per animal was 100 mg of active substance per kg of body weight.

On the sixth day after commencement of the treatment, the animals were killed and dissected. The evaluation of the results after dissection of the test animals was on the basis of the number of mouse oxyuris present in the intestines; untreated but similarly infested mice were used as a control.

| Active substance | Infestation of the 5 test mice on dissection | Infestation of the control mice on dissection |
|---|---|---|
| 1-(4',6'-dichloro-s-triazin-2'-yl-carbamoyl)-2-methoxycarbonylamino-benzimidazole | 0-0-0-0-0 | 4-8-11-13 |

I claim:

1. A pesticidal composition for controlling bacteria, fungi and nematodes comprising a pesticidally effective amount of 1-(4', 6'-dichloro-s-triazin-2-ylcarbamoyl)-2-methoxy-carbonylaminobenzimidazole and a pesticide carrier.

2. A method for combatting phytopathogenic fungi which comprises applying thereto a fungicidally effective amount of 1,(4', 6'-dichloro-s-triazin-2-ylcarbamoyl)-2-methoxy-carbonylaminobenzimidazole.

* * * * *